United States Patent
Ito

(10) Patent No.: US 11,176,633 B2
(45) Date of Patent: Nov. 16, 2021

(54) IMAGE PROCESSING APPARATUS, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Keisuke Ito, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/893,725

(22) Filed: Jun. 5, 2020

(65) Prior Publication Data

US 2020/0302569 A1 Sep. 24, 2020

Related U.S. Application Data

(63) Continuation of application No. 16/151,432, filed on Oct. 4, 2018, now Pat. No. 10,706,495.

(30) Foreign Application Priority Data

Oct. 10, 2017 (JP) .............................. JP2017-197059
Jan. 18, 2018 (JP) .............................. JP2018-006687

(51) Int. Cl.
*G06F 3/12* (2006.01)
*G06F 9/445* (2018.01)
(Continued)

(52) U.S. Cl.
CPC ................ *G06T 1/20* (2013.01); *G06F 3/123* (2013.01); *G06F 3/1204* (2013.01);
(Continued)

(58) Field of Classification Search
CPC ..... G06T 1/20; G06T 1/0007; G06F 16/5866; G06F 3/1204; G06F 3/123; G06F 3/1285;
(Continued)

(56) References Cited

U.S. PATENT DOCUMENTS 8,661,514 B2 2/2014 Akutsu
9,426,322 B2 8/2016 Ito
(Continued)

FOREIGN PATENT DOCUMENTS

CN 101017483 A 8/2007
CN 104038657 A 9/2014
(Continued)

OTHER PUBLICATIONS

Chinese Office Action dated Jul. 3, 2020 in counterpart Chinese application No. 201811154807.5.
(Continued)

*Primary Examiner* — Anibal Rivera
(74) *Attorney, Agent, or Firm* — Venable LLP

(57) ABSTRACT

This image processing apparatus accepts a request to execute predetermined image processing, acquires an image processing name indicating a name of the predetermined image processing from the accepted request, selects a plugin application corresponding to the acquired image processing name from one or more installed plugin applications, and instructs the selected plugin application to perform the predetermined image processing.

11 Claims, 9 Drawing Sheets

(51) Int. Cl.

| | | |
|---|---|---|
| *G06F 9/46* | (2006.01) | |
| *H04N 1/32* | (2006.01) | |
| *G06T 1/20* | (2006.01) | |
| *G06F 9/30* | (2018.01) | |
| *G06T 1/00* | (2006.01) | |
| *G06F 16/58* | (2019.01) | |
| *H04N 1/00* | (2006.01) | |
| *H04N 1/40* | (2006.01) | |

(52) U.S. Cl.
CPC .......... *G06F 3/1285* (2013.01); *G06F 9/3004* (2013.01); *G06F 9/44526* (2013.01); *G06F 16/5866* (2019.01); *G06T 1/0007* (2013.01); *H04N 1/00938* (2013.01); *H04N 1/00278* (2013.01); *H04N 1/00952* (2013.01); *H04N 1/40* (2013.01)

(58) Field of Classification Search
CPC .............. G06F 9/3004; G06F 9/44526; H04N 1/00938; H04N 1/00278; H04N 1/00952; H04N 1/40
See application file for complete search history.

(56) References Cited

U.S. PATENT DOCUMENTS

| | | | |
|---|---|---|---|
| 9,547,461 B2 | 1/2017 | Kobayashi et al. | |
| 10,038,808 B1* | 7/2018 | Bhaskaran | H04N 1/00973 |
| 10,051,139 B2 | 8/2018 | Ito | |
| 2004/0239973 A1* | 12/2004 | Tanaka | H04N 1/00477 |
| | | | 358/1.13 |
| 2005/0172123 A1* | 8/2005 | Carpentier | G06F 21/60 |
| | | | 713/165 |
| 2008/0016520 A1* | 1/2008 | Kong | G06F 9/44526 |
| | | | 719/329 |
| 2008/0235624 A1* | 9/2008 | Murata | G06F 3/0482 |
| | | | 715/825 |
| 2009/0144758 A1* | 6/2009 | Murakawa | G06F 9/451 |
| | | | 719/328 |
| 2010/0198841 A1* | 8/2010 | Parker | G06F 16/951 |
| | | | 707/750 |
| 2010/0211991 A1* | 8/2010 | Akutsu | G06T 1/20 |
| | | | 726/3 |
| 2011/0041144 A1* | 2/2011 | Araki | G06F 9/541 |
| | | | 719/328 |
| 2011/0067026 A1* | 3/2011 | Nishio | G06F 21/608 |
| | | | 718/100 |
| 2011/0299123 A1* | 12/2011 | Utsumi | G06F 3/1222 |
| | | | 358/1.15 |
| 2013/0024854 A1* | 1/2013 | Kumagai | G06F 8/656 |
| | | | 717/174 |
| 2013/0063772 A1* | 3/2013 | Bae | H04N 1/00949 |
| | | | 358/1.15 |
| 2014/0082609 A1* | 3/2014 | Ono | G06F 8/60 |
| | | | 717/177 |
| 2014/0146363 A1* | 5/2014 | Hirokawa | H04N 1/00244 |
| | | | 358/1.15 |
| 2014/0233056 A1* | 8/2014 | Onsen | H04N 1/00938 |
| | | | 358/1.15 |
| 2014/0250444 A1 | 9/2014 | Ono | |
| 2015/0220866 A1* | 8/2015 | Mihara | G06Q 10/06 |
| | | | 705/7.26 |
| 2015/0254026 A1* | 9/2015 | Kobayashi | G06F 3/1288 |
| | | | 358/1.13 |
| 2015/0268908 A1* | 9/2015 | Yagi | G06Q 10/107 |
| | | | 358/1.15 |
| 2016/0004488 A1* | 1/2016 | Hirose | G06F 3/1205 |
| | | | 358/1.15 |
| 2016/0044200 A1* | 2/2016 | Araki | H04N 1/00973 |
| | | | 358/1.15 |
| 2016/0054960 A1 | 2/2016 | Ito | |
| 2016/0337531 A1* | 11/2016 | Masui | H04N 1/00411 |
| 2017/0026534 A1* | 1/2017 | Kinoshita | H04N 1/00503 |
| 2017/0046105 A1* | 2/2017 | Masui | G06F 3/1293 |
| 2017/0075633 A1* | 3/2017 | Sawamura | H04N 1/00514 |
| 2017/0085743 A1* | 3/2017 | Ryuu | H04N 1/4413 |

FOREIGN PATENT DOCUMENTS

| | | |
|---|---|---|
| CN | 104731623 A | 6/2015 |
| CN | 105653335 A | 6/2016 |
| EP | 3094072 A | 2/2016 |
| JP | 2012-162044 A | 8/2012 |
| JP | 20160054960 A | 8/2012 |
| JP | 2015-187837 A | 10/2015 |
| JP | 2017-027467 A | 2/2017 |
| JP | 2017-059922 A | 3/2017 |

OTHER PUBLICATIONS

Allan Raundahl Gregersen et al., Towards Dynamic Plug-in Replacement in Eclipse Plug-in Development, Oct. 2007, [Retrieved on Feb. 27, 2020]. Retrieved from the internet: <URL: https://dLacnn.org/doi/pdf/10.1145/1328279.1328288?download=true> 5 Pages (41-45) (Year: 2007).

Tihana Galinac et al., Plug-in Software Engineering Case Studies, 2016, [Retrieved on Feb. 27, 2020]. Retrieved from the internet: < URL: https://dLacnn.org/doi/pdfZ10.1145/2896839.2896840?download=true> 4 Pages (21-24) (Year: 2016).

Chinese Office Action dated Nov. 15, 2019 in counterpart Chinese application No. 201811154807.5.

* cited by examiner

IMAGE PROCESSING APPARATUS, METHOD FOR CONTROLLING THE SAME, AND NON-TRANSITORY COMPUTER-READABLE STORAGE MEDIUM

CROSS-REFERENCE TO RELATED APPLICATIONS

This application is a Continuation of U.S. patent application Ser. No. 16/151,432, filed Oct. 4, 2018, now U.S. Pat. No. 10,706,495 B2, which claims the benefit of Japanese Patent Application Nos. 2017-197059, filed Oct. 10, 2017, and 2018-006687, filed Jan. 18, 2018, the entire disclosures of which are all hereby incorporated by reference.

BACKGROUND OF THE INVENTION

Field of the Invention

The present invention relates to an image processing apparatus, a method for controlling the same, and a non-transitory computer-readable storage medium.

Description of the Related Art

In an image forming apparatus and an information processing apparatus, it is possible to add a function afterward by adding on a plugin application to a software framework in each apparatus. By adopting such a method, it becomes possible to add a function to each apparatus without modifying an existing source code in the apparatus as little as possible. When using the added function, a request source module for the function designates a plugin application corresponding to the function, and then notifies the software framework of an execution request. The software framework executes the designated plugin application in accordance with the request.

Japanese Patent Laid-Open No. 2012-162044 proposes a technique of displaying a Web page on a UI of an image processing apparatus to which a plugin application is added on, executing a script linked with a corresponding portion of the Web page when a user selects the portion, and calling a corresponding plugin application.

However, the above-described related art has a problem to be described below. When using the added function, the request source module for the function needs to select an appropriate plugin application. In the above-described related art, for example, the request source module for the function inquires of another information processing apparatus a specific plugin application to be used, and then selects the plugin application in accordance with an answer for it. At this time, if the information processing apparatus to be inquired does not exist, the request source module for the function itself needs to determine and select the specific plugin application to be used. If the request source module for the function selects a wrong plugin, it may execute an unintended process. In addition, some constraint acts on a screen arrangement or specification while designing and developing a product by conducting registration with a plugin application or the like being linked with a selectable (operable) portion of a screen or the like displayed in a Web page on the UI. Consequently, the degree of freedom in design may be decreased considerably.

SUMMARY OF THE INVENTION

The present invention enables realization of a mechanism in which a request source module for a function added to an apparatus afterward selects an appropriate plugin application preferably when using the function.

One aspect of the present invention provides an image processing apparatus capable of adding a function to be provided by installing a plugin application, the apparatus comprising: a memory device that stores a set of instructions; and at least one processor that executes the set of instructions to: accept a request to execute predetermined image processing; acquire an image processing name indicating a name of the predetermined image processing from the accepted request, select a plugin application corresponding to the acquired image processing name from not less than one installed plugin application, and instruct the selected plugin application to perform the predetermined image processing.

Another aspect of the present invention provides an image processing apparatus capable of adding a function to be provided by installing a plugin application, the apparatus comprising: a memory device that stores a set of instructions; and at least one processor that executes the set of instructions to: accept a request to execute predetermined image processing; acquire, from the accepted request, an image processing name indicating a name of the predetermined image processing and a parameter related to the predetermined image processing, specify not less than one plugin application by using the acquired image processing name from not less than one installed plugin application, select a plugin application corresponding to the acquired parameter from the not less than one specified plugin application, instruct the selected plugin application to perform the predetermined image processing, and select a plugin application capable of executing the predetermined image processing inside the image processing apparatus in a case where the acquired parameter indicates a predetermined value, and select a plugin application that implements the predetermined image processing by requesting at least a part of the predetermined image processing outside the image processing apparatus in a case where the acquired parameter does not indicate the predetermined value.

Still another aspect of the present invention provides a method for controlling an image processing apparatus capable of adding a function to be provided by installing a plugin application, the method comprising: accepting a request to execute predetermined image processing; acquiring an image processing name indicating a name of the predetermined image processing from the accepted request, selecting a plugin application corresponding to the acquired image processing name from not less than one installed plugin application, and instructing the selected plugin application to perform the predetermined image processing.

Yet still another aspect of the present invention provides a method for controlling an image processing apparatus capable of adding a function to be provided by installing a plugin application, the method comprising: accepting a request to execute predetermined image processing; acquiring, from the accepted request, an image processing name indicating a name of the predetermined image processing and a parameter related to the predetermined image processing, specifying not less than one plugin application by using the acquired image processing name from not less than one installed plugin application, selecting a plugin application corresponding to the acquired parameter from the not less than one specified plugin application, instructing the selected plugin application to perform the predetermined image processing, and selecting a plugin application capable of executing the predetermined image processing inside the image processing apparatus in a case where the acquired parameter indicates a predetermined value, and selecting a plugin application that implements the predetermined image processing by requesting at least a part of the predetermined image processing outside the image processing apparatus in a case where the acquired parameter does not indicate the predetermined value.

Still yet another aspect of the present invention provides a non-transitory computer-readable storage medium storing a program for causing a computer to execute each step in a method for controlling an image processing apparatus capable of adding a function to be provided by installing a plugin application, the method comprising: accepting a request to execute predetermined image processing; acquiring an image processing name indicating a name of the predetermined image processing from the accepted request, selecting a plugin application corresponding to the acquired image processing name from not less than one installed plugin application, and instructing the selected plugin application to perform the predetermined image processing.

Yet still another aspect of the present invention provides a non-transitory computer-readable storage medium storing a program for causing a computer to execute each step in a method for controlling an image processing apparatus capable of adding a function to be provided by installing a plugin application, the method comprising: accepting a request to execute predetermined image processing; acquiring, from the accepted request, an image processing name indicating a name of the predetermined image processing and a parameter related to the predetermined image processing, specifying not less than one plugin application by using the acquired image processing name from not less than one installed plugin application, selecting a plugin application corresponding to the acquired parameter from the not less than one specified plugin application, instructing the selected plugin application to perform the predetermined image processing, and selecting a plugin application capable of executing the predetermined image processing inside the image processing apparatus in a case where the acquired parameter indicates a predetermined value, and selecting a plugin application that implements the predetermined image processing by requesting at least a part of the predetermined image processing outside the image processing apparatus in a case where the acquired parameter does not indicate the predetermined value.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Arrangement of Image Forming System>

Figure 1:
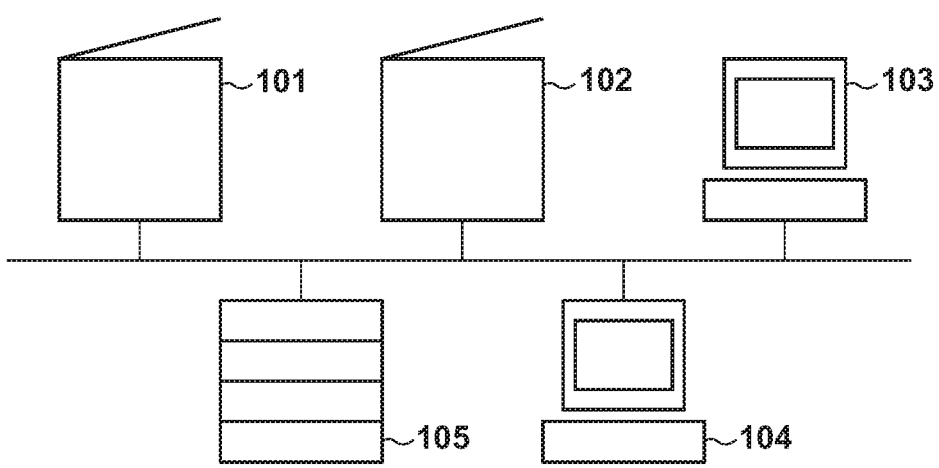
FIG. 1 is a view showing an arrangement example of an image forming system according to an embodiment.

The first embodiment of the present invention will be described below. First, an arrangement example of an image forming system according to this embodiment will be described with reference to FIG. 1. FIG. 1 is a view showing an example of the arrangement of the image forming system. The image forming system includes image forming apparatuses 101 and 102 each serving as an example of an image processing apparatus, information processing terminals 103 and 104, and a server 105. The image forming apparatuses 101 and 102, the information processing terminals 103 and 104, and the server 105 are connected to and communicated with each other via a network 106. The network 106 is a network such as a LAN (Local Area Network) or the Internet through which the apparatuses in the image forming system can communicate with each other.

FIG. 1 illustrates an example in which the two image forming apparatuses 101 and 102 are arranged. However, an arbitrary number (one or more) of image forming apparatuses can be arranged in the image forming system. In this embodiment, the image forming apparatuses 101 and 102 are MFPs (Multifunction Peripherals), but can be any one of, for example, an MFP, a printing apparatus, a copying machine, and a facsimile apparatus. In the following description, it is assumed that the image forming apparatuses 101 and 102 have the same arrangement, and a detailed description of the image forming apparatus 102 will be omitted.

The image forming apparatus 101 includes a printer and a scanner, and can, for example, receive a print request (print data) from the information processing terminals 103 and 104 and cause the printer to perform printing. The image forming apparatus 101 can also cause the scanner to read an original image and generate image data. The image forming apparatus 101 can cause the printer to perform printing based on the image data generated by the scanner and can store print data received from the information processing terminals 103 and 104. In addition, the image forming apparatus 101 can perform transmission of the image data generated by the scanner to the information processing terminals 103 and 104, image processing using the server 105, and printing of a document stored in the server 105. The image forming apparatus 101 further provides various kinds of services using the printer and scanner, and can be arranged such that a new service (function) can be added. More specifically, the addition of the new service can be implemented by installing an additional plugin application in the image forming apparatus 101.

<Hardware Arrangement of Image Forming Apparatus>

Figure 2:
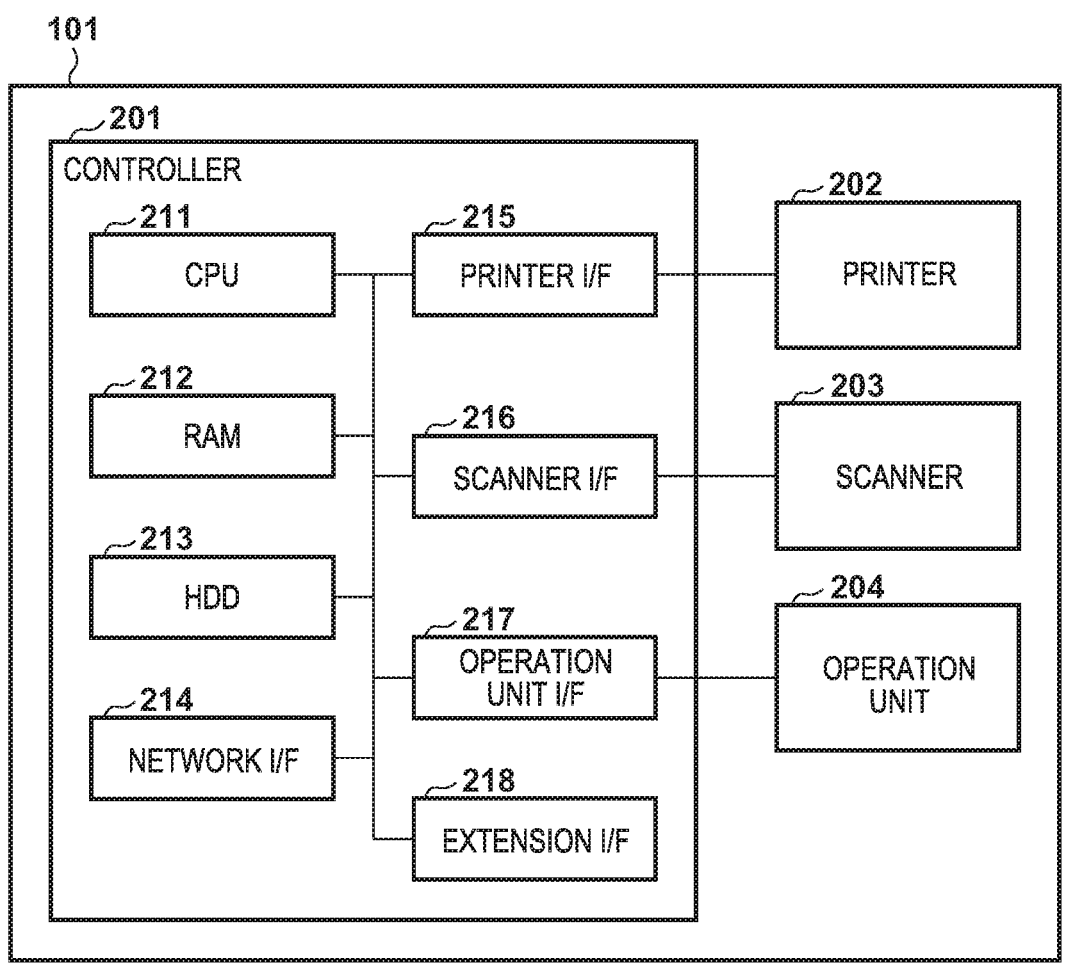
FIG. 2 is a block diagram showing an arrangement example of an image forming apparatus according to the embodiment.

Next, an example of the hardware arrangement of the image forming apparatus 101 will be described with reference to FIG. 2. The image forming apparatus 101 includes a controller 201, a printer 202, a scanner 203, and an operation unit 204. The controller 201 includes a CPU 211, a RAM 212, an HDD 213, a network interface (I/F) 214, a printer I/F 215, a scanner I/F 216, an operation unit I/F 217, and an extension I/F 218. The CPU 211 can exchange data with the RAM 212, the HDD 213, the network I/F 214, the printer I/F 215, the scanner I/F 216, the operation unit I/F 217, and the extension I/F 218. In addition, the CPU 211 loads a program (instruction) read out from the HDD 213 in the RAM 212 and executes the program loaded in the RAM 212.

Programs executable by the CPU 211, setting values used in the image forming apparatus 101, data associated with processing requested from a user, and the like can be stored in the HDD 213. The RAM 212 is used to temporarily store the program read out from the HDD 213 by the CPU 211. The RAM 212 is used to store various kinds of data necessary for executing the program. The network I/F 214 is an interface for communicating with other apparatuses in the image forming system via the network 106. The network I/F 214 can notify the CPU 211 of reception of data and transmit the data on the RAM 212 to the network 106.

The printer I/F 215 can transmit print data received from the CPU 211 to the printer 202 and notify the CPU 211 of the state of the printer 202 notified from the printer 202. The scanner I/F 216 can transmit, to the scanner 203, an image reading instruction received from the CPU 211 and transmit, to the CPU 211, the image data received from the scanner 203. The scanner I/F 216 can notify the CPU 211 of the state of the scanner 203 notified from the scanner 203.

The operation unit I/F 217 can notify the CPU 211 of an instruction input on the operation unit 204 by the user and transmit, to the operation unit 204, screen information of an operation screen which accepts a user operation. The extension I/F 218 is an interface capable of connecting an external apparatus to the image forming apparatus 101. The extension I/F 218 is an interface in the form of, for example, USB (Universal Serial Bus). When an external storage device such as a USB memory is connected to the extension I/F 218, the image forming apparatus 101 can read out the data stored in the external storage device and write the data to the external storage device.

The printer 202 can print, on a sheet, an image corresponding to the image data received from the printer I/F 215 and notify the printer I/F 215 of the state of the printer 202. The scanner 203 can read an original image in accordance with an image reading instruction received from the scanner I/F 216 to generate image data, and transmit the generated image data to the scanner I/F 216. In addition, the scanner 203 can notify the scanner I/F 216 of the state of the scanner 203. The operation unit 204 is an interface for causing the user to perform operation for sending various kinds of instructions to the image forming apparatus 101. For example, the operation unit 204 includes a display unit having a touch panel function, provides an operation screen to the user, and accepts an operation from the user via the operation screen.

<Image Processing System of Image Forming Apparatus>

Figure 8:
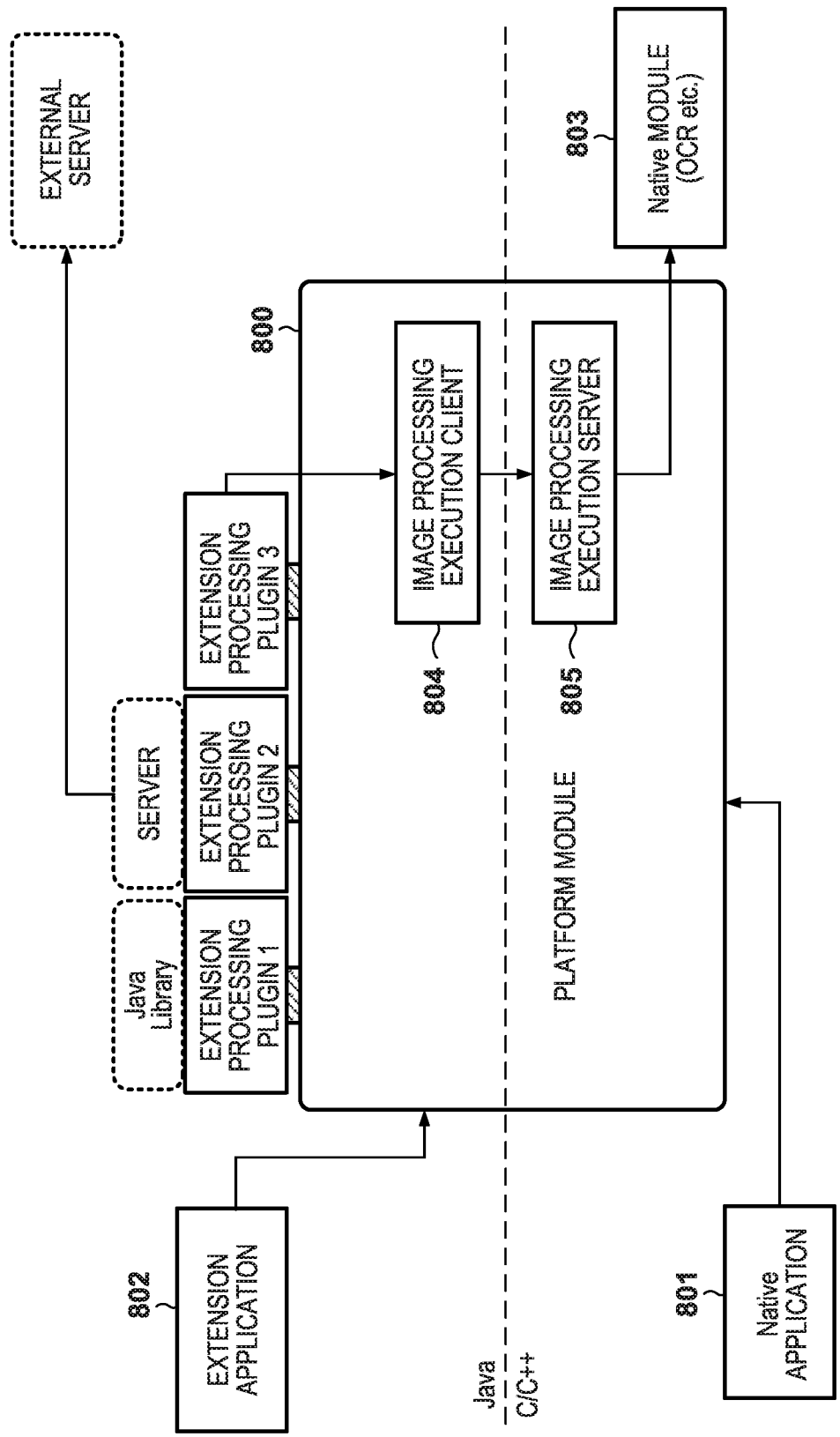
FIG. 8 is a block diagram showing the outline of an image processing system installed in the image forming apparatus according to the embodiment.

Next, the outline of an image processing (information processing) system installed in the image forming apparatus 101 according to this embodiment will be described with reference to FIG. 8. In this embodiment, the image processing system includes a platform module 800, a native application 801, an extension application 802, a native module 803, an image processing execution client 804, an image processing execution server 805, and extension processing plugins 1 to 3.

The native application 801 or the extension application 802 (Java application) can request the platform module 800 to perform execution of desired image processing (information processing) in accordance with a user instruction. The native application 801 is described by a program language such as a C language and is the standard (preinstalled) application of the image forming apparatus 101. The native application 801 includes, for example, a print application, a copy application, a scan application, and a transmission application. In order to update the native application 801, the firmware of the image forming apparatus 101 must be updated. The extension application 802 is an application described by a program language such as a Java language. The extension application 802 is installed afterward in the image forming apparatus 101 to extend the function of the image forming apparatus 101. For example, the extension application 802 is a login application for managing user login to the image forming apparatus 101.

In the image forming apparatus 101, one or more extension processing plugins can be operated on the platform module 800. In this embodiment, the three extension processing plugins 1 to 3 are operated on the platform module 800. The extension processing plugins 1 to 3 are installed afterward in the image forming apparatus 101 to extend the functions of the image forming apparatus 101 like the extension application 802. To update the function of the extension processing plugin, the plugin is simply updated, and the firmware of the image forming apparatus 101 need not be updated.

In this embodiment, the extension processing plugin 1 is an extension processing plugin connected to a library described by the Java language in the image forming apparatus 101 to execute processing. The extension processing plugin 2 is an extension processing plugin connected to an external server such as a cloud server to execute processing. The extension processing plugin 3 is an extension processing plugin connected to the native module 803 described by the C language to execute processing.

The extension processing plugin 3 is connected to the native module 803 via the image processing execution client 804 and the image processing execution server 805. The native module 803 is preinstalled in the image forming apparatus 101 like the native application 801. In order to update the native module 803, the firmware of the image forming apparatus 101 needs to be updated like the native application 801. According to this embodiment, the native module 803 is a module which provides OCR processing. Note that the extension processing plugins 1 to 3 are merely examples, and the connection destination and processing contents of the extension processing plugin are not limited to the above connection destinations and processing contents.

The platform module 800 can accept an image processing execution request from the native application 801 or the extension application 802. For example, the platform module 800 accepts the execution request of the OCR processing for extracting a character image from the scanned image from the scan application. Upon accepting the image processing execution request, the platform module 800 selects an extension processing plugin for executing image processing in accordance with an execution request out of the extension processing plugins 1 to 3 and instructs to cause the selected extension processing plugin to execute image processing. For example, the platform module 800 decides the extension processing plugin to be used, based on the type and contents (whether promptness is required, the degree of processing load, and the like) of the image processing, the execution of which is requested. The platform module 800 obtains the execution result of the requested image processing from the used extension processing plugin. The platform module 800 outputs the obtained execution result as a response to the execution request to the application of the transmission source of the execution request.

Note that each element shown in FIG. 8 has the following correspondence relationship with each element (to be described below) shown in FIG. 3. The platform module 800 corresponds to a connection library 332. The native application 801 corresponds to device control libraries 309. The extension application 802 corresponds to a single function plugin application 302. The extension processing plugins 1 to 3 correspond to an image processing plugin application 303. The native module 803 corresponds to a native module 316. The image processing execution client 804 corresponds to a native client 331. The image processing execution server 805 corresponds to a native server 315.

<Software Arrangement of Image Forming Apparatus>

Next, an example of the software arrangement of the image forming apparatus 101 will be described with reference to FIG. 3. The software arrangement of the image forming apparatus 101 is implemented by, for example, the programs stored in the HDD 213. The software arrangement shown in FIG. 3 includes a hierarchical structure formed from a lowermost layer including an operating system 317, an uppermost layer corresponding to Java® language execution environment 330, and an intermediate layer between the lowermost and uppermost layers. This hierarchical structure has a relationship in which excluding some exceptions, a service provided by a lower layer can be used by an upper layer. Note that the exceptions indicate that each device control library 309 can use, via an image processing controller 340, the image processing plugin application 303 included in the uppermost layer, as will be described later.

The lowermost layer is a layer including the operating system 317 to perform program execution management, memory management, and the like. A printer control driver 318, a scanner control driver 319, and a network I/F control driver 320 are embedded in the operating system 317. The printer control driver 318, the scanner control driver 319, and the network I/F control driver 320 can function to cooperate with each other. The printer control driver 318 is software for controlling the printer 202 via the printer I/F 215. The scanner control driver 319 is software for controlling the scanner 203 via the scanner I/F 216. The network I/F control driver 320 is software for controlling the network I/F 214.

The intermediate layer higher than the lowermost layer includes the device control libraries 309 and the image processing controller 340. In this embodiment, the programs of the device control libraries 309 and the image processing controller 340 can be described by a compiler language such as the C language or C++ language and stored in the HDD 213 in the form of an object file which can be directly executed by the CPU 211.

The uppermost layer is an application layer including an application operated in the Java language execution environment 330. The uppermost layer includes plugin applications 301 and the device control applications 304 and further includes the native client 331, the connection library 332, and an external client 333. Each application of the uppermost layer is operated using an API provided by a corresponding one of the device control libraries 309 or the connection library 332, thereby providing various kinds of functions. Note that the functions of the device control applications 304 can be extended by updating the firmware of the image forming apparatus 101.

In this embodiment, the programs of the plugin applications 301 and the device control applications 304 can be described by the Java language and stored in the HDD 213 in a Java byte code format which can be interpreted by a Java virtual machine. For this reason, the CPU 211 executes the program of the Java virtual machine, reads out the program in the Java byte code format from the HDD 213, and causes the Java virtual machine to execute the program, thereby implementing processing by each application of the uppermost layer.

As described above, one of the reasons for using the programming language such as the Java language is descriptive facilitation of the program. Since the management of the memory area is automatically performed in the Java, a developer need not manage the memory area. For this reason, the developer's labor at the time of describing a program can be reduced, and it is expected that the developing efficiency can be improved.

(Device Control Libraries 309)

Next, the device control libraries 309 will be described in more detail. The device control libraries 309 are statically or dynamically linked to the single function plugin application 302 or a corresponding one of the device control applications 304 to be described later. Each device control library 309 uses the operating system 317 of the lowermost layer based on an instruction by each application of the uppermost layer. In addition, each device control library 309 can request the execution of the image processing for a native connection library 314. As an example, the device control libraries 309 are formed from a print library 310, a copy library 311, a scan storage library 312, and a scan transmission library 313.

The print library 310 provides an API (Application Programming Interface) for controlling a print job using the function of the printer control driver 318. The print job indicates a series of processes of performing printing at the printer 202 based on print data stored in the HDD 213 or print data received from an external apparatus (the information processing terminal 103 or 104, or the like) via the network I/F 214. The copy library 311 provides an API for controlling a copy job using the functions of the scanner control driver 319 and the printer control driver 318. The copy job is a series of processes for scanning an original image at the scanner 203 and printing at the printer 202 based on the obtained image data.

The scan storage library 312 provides an API for controlling a scan storage job using the function of the scanner control driver 319. The scan storage job is a series of processes of performing scanning of the original image at the scanner 203, conversion of the obtained image data into the print data or data in a general format, and storage of data in the HDD 213 or an external storage device such as a USB memory connected to the extension I/F 218. Note that the general format is a data format such as PDF (Portable Document Format) or JPEG (Joint Photographic Experts Group).

The scan transmission library 313 provides an API for controlling a scan transmission job using the functions of the scanner control driver 319 and the network I/F control driver 320. The scan transmission job is a series of processes for performing scanning of the original image at the scanner 203, conversion of the obtained image data into data in a general format, and transmission of the data to an external apparatus via the network I/F 214. In the scan transmission job, the data is transmitted to, for example, the file server such as the server 105 via the network I/F 214 or transmitted to an external apparatus such as the information processing terminal 103 or 104 by email.

(Image Processing Controller 340)

Next, the image processing controller 340 will be described in more detail. The image processing controller 340 includes the native connection library 314, the native server 315, and the native module 316. Upon receiving an image processing execution request from the device control libraries 309, the native connection library 314 transfers the request contents to the connection library 332. Upon receiving a request from the application operating in the Java language execution environment 330 (to be described later), the native server 315 provides the function of executing the native module 316. The native module 316 is software capable of executing various kinds of image processing.

Figure 3:
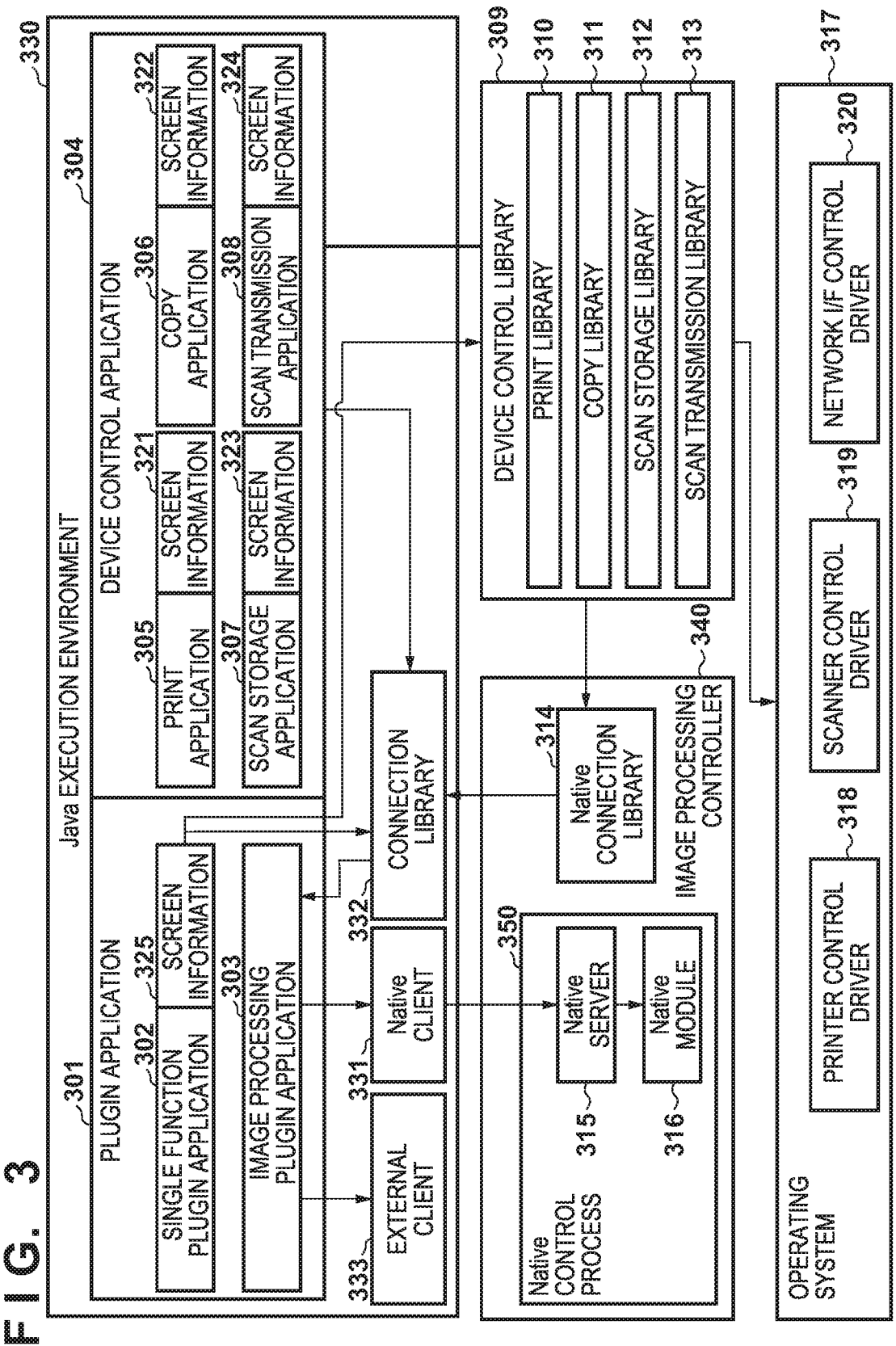
FIG. 3 is a hierarchy diagram showing a software arrangement example in the image forming apparatus according to the embodiment.

The native server 315 and the native module 316 are executed on a native control process 350, as shown in FIG. 3. The native control process 350 is a program execution unit having a logical memory space separated from a logical memory space of software other than the native server 315 and the native module 316. Note that this memory space separation can be implemented by another method such as a method using a process mechanism of a general OS (Operating System).

According to this embodiment, as described above, the logical memory space of the native control process 350 is independent of the logical memory space of the other software. For this reason, even if an error occurs in the memory operation on the native control process 350, such an error can be prevented from influencing the logical memory space of the application on the side for requesting the execution of the image processing on the native server 315. That is, the error in the operation of the application on the side for requesting the execution of the image processing on the native server 315 can be prevented.

(Device Control Applications 304)

Next, the device control applications 304 will be described in more detail. As an example, the device control applications 304 include a print application 305, a copy application 306, a scan storage application 307, and a scan transmission application 308. The device control applications 304 are resident applications in the image forming apparatus 101.

The print application 305, the copy application 306, the scan storage application 307, and the scan transmission application 308 have screen information 321, screen information 322, screen information 323, and screen information 324, respectively. The CPU 211 can display the corresponding operation screen on the operation unit 204 via the operation unit I/F 217 based on the screen information 321, the screen information 322, the screen information 323, and the screen information 324. The CPU 211 can accept an instruction from the user via the displayed operation screen.

Upon detecting that the user operates operation unit 204 to change the settings of the device control applications 304, the CPU 211 writes the change contents in the HDD 213. Upon detecting that the user operates the operation unit 204 to request the job execution, the CPU 211 (each device control application 304) calls the API of a corresponding one of the device control libraries 309, thereby starting execution of the job. In addition, the CPU 211 (each device control application 304) can request the execution of the image processing to the connection library 332.

For example, the print application 305 calls the API of the print library 310 to execute a print job. The copy application 306 calls the API of the copy library 311 to execute a copy job. The scan storage application 307 calls the API of the scan storage library 312 to execute a scan storage job. The scan transmission application 308 calls the API of the scan transmission library 313 to execute a scan transmission job.

(Plugin Applications 301)

Next, the plugin applications 301 will be described in more detail. Different from the device control applications 304 as the resident applications, the plugin applications 301 are applications which can be installed or uninstalled as a plugin to or from the image forming apparatus 101. The plugin applications 301 are installed in the image forming apparatus 101 by using a remote UI (User Interface) or the like. Note that in the external apparatus such as the information processing terminal 103 or 104, the remote UI is a mechanism for accessing the image forming apparatus 101 from a Web browser and allowing confirmation of a situation of the image forming apparatus 101, an operation of the print job, and various kinds of settings.

The plugin applications 301 include the single function plugin application 302 and the image processing plugin application 303. In the plugin applications 301 (the single function plugin application 302 and the image processing plugin application 303), programs necessary for the respective operations are packaged. The plugin applications 301 can be individually activated or stopped.

A series of operations from installation to the activation, stop and uninstallation of the plugin applications 301 will be described below. When detecting the installation of the plugin applications 301 using the remote UI or the like, the CPU 211 stores the information of the plugin applications in the HDD 213. Next, upon detecting the activation instruction to the plugin applications 301, the CPU 211 instructs the activation of the plugin applications. While the plugin applications 301 are activated, the functions of the plugin applications can be provided.

After that, when the CPU 211 detects a stop instruction to the plugin applications 301, the CPU 211 instructs the stop of the plugin applications 301. In addition, when the CPU 211 detects an uninstallation instruction to the plugin applications 301, the information of the plugin applications 301 is deleted from the HDD 213, thereby uninstalling the plugin applications. Note that each instruction detected by the CPU 211 can be performed from, for example, the remote UI or the operation unit 204. However, an instruction can be performed by a method other than the above method.

(Single Function Plugin Application 302)

Next, the single function plugin application 302 will be described in more detail. The single function plugin application 302 has screen information 325. Based on the screen information 325, the CPU 211 can display the corresponding operation screen on the operation unit 204 via the operation unit I/F 217. In addition, the CPU 211 can accept an instruction from the user via the displayed operation screen.

The single function plugin application 302 can provide a function or screen different from the device control applications 304 to the user by calling the API provided by the device control libraries 309. The single function plugin application 302 can provide a plurality of functions by the device control libraries 309 in combination. For example, the single function plugin application 302 can provide the function of copying a given image and transmitting image data obtained by scanning to a specific destination in a destination database which holds this plugin application itself.

Note that the single function plugin application 302 need not have the image processing function. In this case, no setting is performed for the image processing. When the device control libraries 309 receive, from the single function plugin application 302, print data or image data converted into a general format, the device control libraries 309 instruct control of necessary processing to the operating system 317, thereby executing the job.

(Image Processing Plugin Application 303)

Next, the image processing plugin application 303 will be described in more detail. The image processing plugin application 303 is an application for providing the specific image processing. Note that the image processing plugin application 303 may be formed from a plurality of applications for executing different image processing operations. For example, a plurality of applications capable of executing, for example, image format conversion, skew correction, form recognition, and OCR processing of an input image may be installed in the image forming apparatus 101 as the image processing plugin application 303. Note that it is desirable that the image processing plugin application 303 holds, as image processing information indicating image processing executable in the application, the name of the image processing (image processing name) when installed additionally. This makes it possible to preferably determine whether image processing corresponding to an image processing name inquired in step S603 of FIG. 6 (to be described later) is executable.

The image processing plugin application 303 can accept an image processing request (an image processing execution request) from the single function plugin application 302 or the device control applications 304 via the connection library 332. In addition, the image processing plugin application 303 can also accept an image processing request from the device control libraries 309 via the native connection library 314 and the connection library 332.

The image processing plugin application 303 executes image processing in accordance with an accepted image processing request. The image processing request can include image data and processing parameters of a processing target. The processing parameters include parameters related to an image processing name and image processing (to be described later). In addition, the image processing plugin application 303 can use the image processing function of the native client 331 based on the image processing request, as needed. Note that the image processing plugin application 303 need not have its image processing function. Even if the image processing plugin application 303 does not have the image processing function, the image processing plugin application 303 can use the image processing function of the native module 316 by using the native client 331.

One of the reasons for causing the image processing plugin application 303 to use the native module 316 is a high processing speed in image processing. More specifically, when performing image processing, execution of complicated numerical arithmetic operations in a large amount is required, and a large-capacity memory in the course of processing is required. In this case, a higher processing speed can be expected by using not a processing system using a programming language for performing processing via a virtual machine like Java, but a processing system using a compiler language for generating an object file directly executed by the CPU.

Furthermore, the image processing plugin application 303 can also transmit an input image and an image processing request to an external apparatus such as the server (external apparatus) 105 by using the external client 333, and request the execution of image processing by an external image processing client. This makes it possible to execute image processing which cannot be executed by the image forming apparatus 101 or execute high-speed processing using a large-capacity memory.

<Hardware Arrangement of Server>

Figure 4:
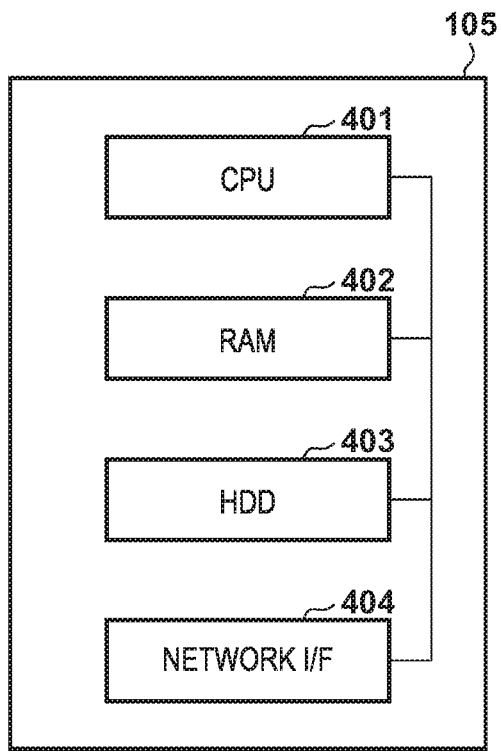
FIG. 4 is a block diagram showing an arrangement example of a server according to the embodiment.

Next, an arrangement example of a server according this embodiment will be described with reference to FIG. 4. The server 105 includes a CPU 401, a RAM 402, an HDD 403, and a network I/F 404. The CPU 211 can exchange data with the RAM 402, the HDD 403, and the network I/F 404. In addition, the CPU 401 loads a program (instruction) read out from the HDD 403 in the RAM 402 and executes the program loaded in the RAM 402.

Programs executable by the CPU 401, setting values used in the server 105, data associated with processing requested from the user, and the like can be stored in the HDD 403. The RAM 402 is used to temporarily store the program read out from the HDD 403 by the CPU 401. The RAM 402 can store various kinds of data necessary for executing the program. The network I/F 404 is an interface for performing network communication with other apparatuses that exist on a network. The network I/F 404 can notify the CPU 401 of reception of data and transmit the data on the RAM 402 to the network 106.

<Software Arrangement of Server>

Figure 5:
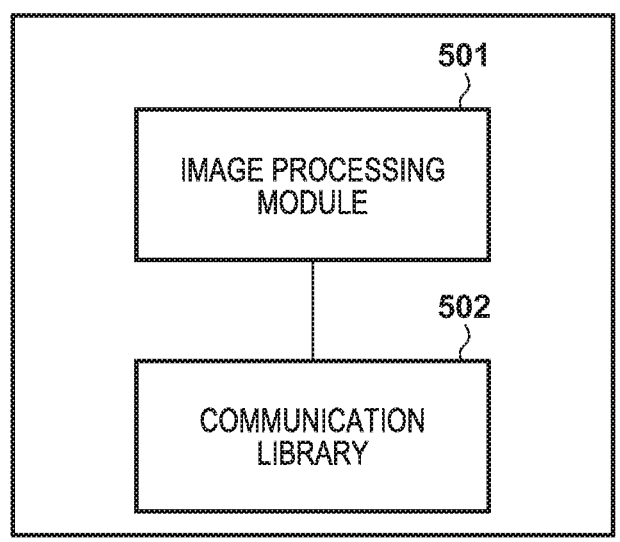
FIG. 5 is a hierarchy diagram showing a software arrangement example in the server according to the embodiment.

Next, an example of a software structure processed by the CPU 401 will be described with reference to FIG. 5. Software that has a structure shown in FIG. 5 is implemented by, for example, the programs stored in the HDD 403 of the server 105. The server 105 includes, as a software arrangement, a module 501 and a communication library 502. Note that there is no intention to limit the software arrangement of the server in the present invention to only the above-described two components, and another module and the like may be included.

The module 501 receives an input image and an image processing request transmitted from the communication library 502, and executes image processing on the input image in accordance with the request. Then, the module 501 makes a notification of processed image data via the communication library 502. The communication library 502 is a library that provides an API for executing communication processing with another device existing on the network 106 such as the image forming apparatus 101. The communication library 502 receives an input image and an image processing request transmitted from the image forming apparatus 101, and transfers them to the module 501. Furthermore, the communication library 502 transmits, to the image forming apparatus 101, processed image data generated by the module 501.

<Processing Procedure>

Figure 6:
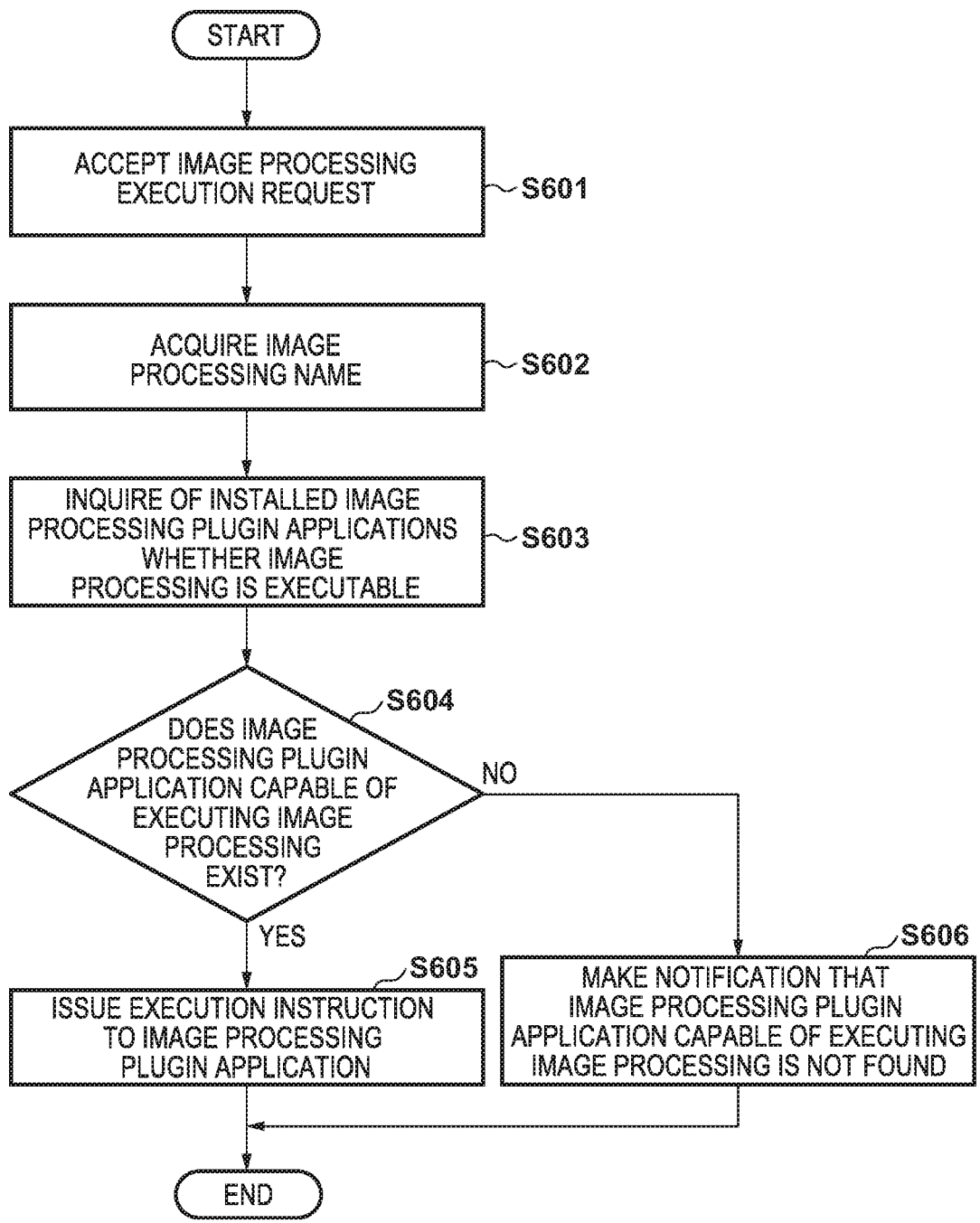
FIG. 6 is a flowchart showing a process of calling an image processing plugin application 303 according to the embodiment.

Next, a processing procedure when the connection library 332 calls the image processing plugin application 303 will be described with reference to FIG. 6. Processing to be described below is implemented by, for example, loading programs stored in the HDD 213 in the RAM 212 and causing the CPU 211 to execute the programs.

First, in step S601, the connection library 332 functions as an acceptance unit and accepts an image processing execution request from the single function plugin application 302 or the device control applications 304. Note that the connection library 332 receives, as image processing information corresponding to image processing, the execution of which is requested, an image processing name and designation of a parameter. For example, the image processing name (ImagingName) may be a character string such as "OCR". In addition, a parameter related to the image processing like "language: Japanese" is designated as the parameter.

Next, in step S602, the connection library 332 acquires the image processing name designated in step S601 from the accepted request. Subsequently, in step S603, the connection library 332 designates an image processing name for all the installed image processing plugin applications 303 and makes an inquiry about whether image processing corresponding to it is executable. Note that each image processing plugin application 303 determines whether it can execute image processing corresponding to the designated image processing name and responds to the connection library 332 with that result. Thus, according to this embodiment, it is possible to preferably select a plugin application suitable for requested image processing from installed plugin applications by using an image processing name as a search key. That is, the connection library 332 need not grasp plugins corresponding to various kinds of image processing, and can select an appropriate plugin application by extracting an image processing name from the request and inquiring of the respective plugin applications. Consequently, for example, registration processing such as linking an installed plugin application with each image processing button on a menu screen is not needed, making it possible to improve the degree of freedom in development design in a product and omit extra processing as well.

Next, in step S604, the connection library 332 determines, based on each response, whether the image processing plugin application 303 capable of executing image processing corresponding to the image processing name as the image processing information exists. If the image processing plugin application 303 exists, the process advances to step S605. If the image processing plugin application 303 does not exist, the process advances to step S606. For example, in the above-described example, if the image processing plugin application 303 corresponding to the image processing name "OCR" exists, the process advances to step S605. In step S605, the connection library 332 notifies the image processing plugin application 303 of an image processing execution instruction after notifying it of the parameter designated in step S601. On the other hand, in step S606, the connection library 332 notifies an image processing request source that the image processing plugin application 303 capable of executing image processing is not found for the device control applications 304 or each device control library 309, thereby ending the processing. More specifically, the connection library 332 notifies the request source that a plugin application capable of executing predetermined image processing does not exist.

As described above, the image processing apparatus (image forming apparatus) according to this embodiment accepts a request to execute predetermined image processing and acquires an image processing name indicating a name of the predetermined image processing from the request. In addition, the image processing apparatus selects a plugin application capable of executing accepted predetermined image processing by using the acquired image processing name and instructs the execution of the processing. According to this embodiment, this eliminates the need to select a plugin directly by a request source module using an added image processing function, making it possible to use an appropriate plugin by simply designating an image processing name and reduce a risk of wrong selection of a plugin.

The present invention is not limited to the above-described embodiment, and various modifications can be made. For example, in step S603 described above, the connection library 332 inquires of each image processing plugin application 303 by using an image processing name whether image processing corresponding to the image processing name is executable. Instead of this arrangement, when each image processing plugin application 303 is installed, an image processing name of image processing executable by itself may be registered in linkage with the plugin application for the connection library 332. This allows the connection library 332 to select an appropriate plugin based on information held by itself using an image processing name without inquiring of each image processing plugin application.

Second Embodiment

The second embodiment of the present invention will be described below. In the above-described first embodiment, the connection library 332 selects a plugin by designating an image processing name for the image processing plugin application 303 and making an inquiry about whether image processing corresponding to it is executable.

Only from the image processing name, however, the image processing plugin application 303 may not be selected correctly. A case in which "OCR" is designated as an image processing name will be considered here. As plugins that perform OCR processing, there exist a plugin that requests a process from a native module 316 in a device and a plugin that requests a process from a server 105 via a network 106. The former is a plugin for performing a process for a language such as English an OCR dictionary thereof exists in the device. The latter is a plugin for performing a process for a language a dictionary thereof does not exist in the device. In such a case, there exist a plurality of plugins corresponding to an image processing name of "OCR". It is therefore impossible to select an image processing plugin application 303 correctly only from information of the image processing name.

To cope with this, in this embodiment, parameter information related to image processing is used in addition to an image processing name when selecting the image processing plugin application 303. The parameter is formed by a pair of key and value, and a plurality of pairs may be designated for one image processing operation. In the above-described example, expressing the parameter in the form of "key: value", a term "language: English" is designated. Based on information of the image processing name "OCR", parameter, and "language: English", a connection library 332 can select the image processing plugin application 303 that executes OCR processing by using the native module 316.

As another example, a case is also considered in which plugins to be used are switched by an "input image resolution" designated as a parameter. First, if "input image resolution: 300 DPI" is designated as a parameter, a plugin that requests a process from the native module 316 in the device is used. On the other hand, if "input image resolution: 600 DPI" is designated as a parameter, a plugin that requests a process from the server 105 is used. This is because the space of a RAM 212 needed for processing increases as an input resolution increases, and thus predetermined limitations are imposed on an input image resolution to be processed in an image forming apparatus 101, and it is necessary to request a process from the server 105 if a predetermined input resolution is exceeded.

<Processing Procedure>

Figure 7:
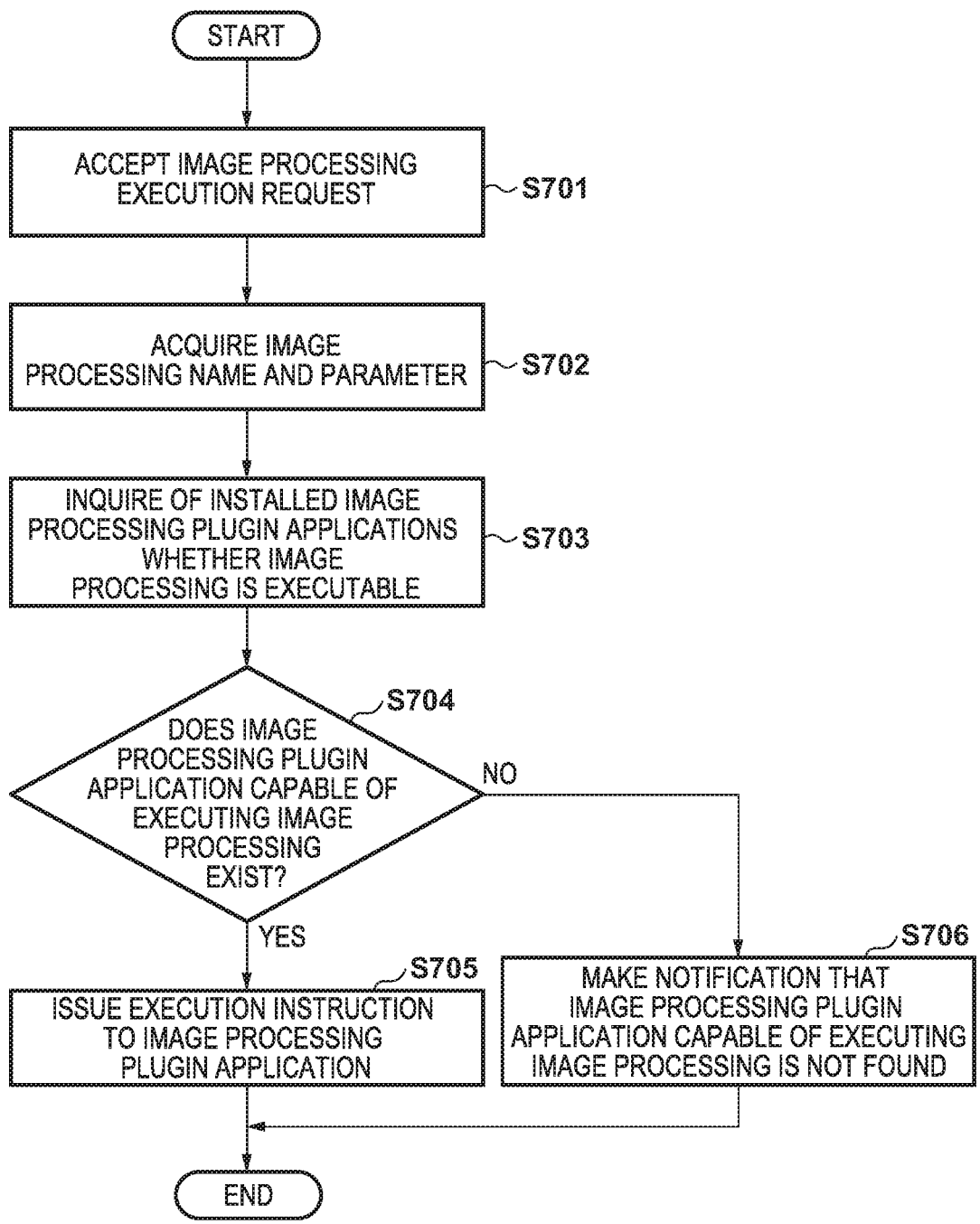
FIG. 7 is a flowchart showing a process of calling an image processing plugin application 303 according to an embodiment.

A processing procedure when the connection library 332 calls the image processing plugin application 303 in this embodiment will be described with reference to FIG. 7. Processing to be described below is implemented by, for example, loading programs stored in an HDD 213 in a RAM 212 and causing a CPU 211 to execute the programs. Note that the system arrangement and the processing procedure of this embodiment are the same as those described in the first embodiment above, a description thereof will be omitted, and only different portions will be described. More specifically, steps S701, S704, S705, and S706 are the same as steps S601, S604, S605, and S606, and thus a description thereof will be omitted.

In step S702, the connection library 332 refers to an image processing name and parameter designated in step S701. Furthermore, in step S703, the connection library 332 designates an image processing name and a parameter for all the installed image processing plugin applications 303, and makes an inquiry about whether image processing corresponding to them is executable.

As described above, according to this embodiment, it becomes possible to select the image processing plugin application 303 under a more detailed condition based on two kinds of information of the image processing name and the parameter. In addition, as described above, in step S703 above, the connection library 332 inquires of each image processing plugin application 303 by using an image processing name and a parameter whether image processing corresponding to the image processing name and parameter is executable. Instead of this arrangement, when each image processing plugin application 303 is installed, an image processing name and parameter corresponding to image processing executable by itself may be registered in linkage with the plugin application for the connection library 332. This allows the connection library 332 to select an appropriate plugin based on information held by itself using an image processing name and a parameter without inquiring of each image processing plugin application.

Third Embodiment

The third embodiment of the present invention will be described below. In the above-described second embodiment, the connection library 332 selects a plugin by designating an image processing name and a parameter for the image processing plugin application 303, and making an inquiry about whether image processing corresponding to them is executable.

However, time may be taken for processing if it is determined whether image processing is executable after designating an image processing name and a parameter for all the image processing plugin applications 303. This is a case in which, for example, the number of image processing plugin applications 303 is large, or a large number of complicated determination logics of whether image processing is executable exist.

In the method of the above-described second embodiment, an inquiry about whether image processing is executable needs to be executed the same number of times as the number of image processing plugin applications 303. With this method, an inquiry process about a plugin capability is performed even for an image processing plugin application without a function of performing designated image processing. For example, even for an image processing plugin application without a function of executing designated image processing, a function indicating a capability of the image processing plugin application is called, and confirmation processing for confirming whether image processing is executable with a designated parameter occurs. If a determination logic for executing this confirmation processing is complicated, a process that need not be executed primarily is to be executed. Furthermore, depending on an application, determination processing for determining whether designated image processing can be performed with a designated parameter may be executed even if the application does not have a function of performing the image processing. By executing these processes that need not be executed primarily, a search time is increased, or a processing load of the CPU 211 is increased.

To cope with this, in this embodiment, an image processing plugin application 303 is selected by operating two-stage filters, maintaining both a processing speed and flexibility. First, the filter of the first stage is applied to narrow down candidates for the image processing plugin applications 303 from only a designated image processing name. This is simply a process of finding out the image processing plugin applications 303 that hold an image processing name matching the designated image processing name. Then, the filter of the second stage is applied to select the appropriate image processing plugin application 303 by designating a parameter for the candidates narrowed down by the filter of the first stage and making an inquiry about whether processing is possible.

Filter processing of the first stage is the first selection processing for selecting plugin applications each capable of executing designated image processing by using an acquired image processing name. In addition, filter processing of the second stage is the second selection processing for selecting a plugin application capable of executing image processing according to a parameter out of plugin applications selected by the first selection processing. This needs to apply processing to only candidates narrowed down in advance, making it possible to suppress an increase in processing time as compared with a case in which the two-stage filters are not operated even if the logic for determining whether processing is executable is complicated.

<Processing Procedure>

Figure 9:
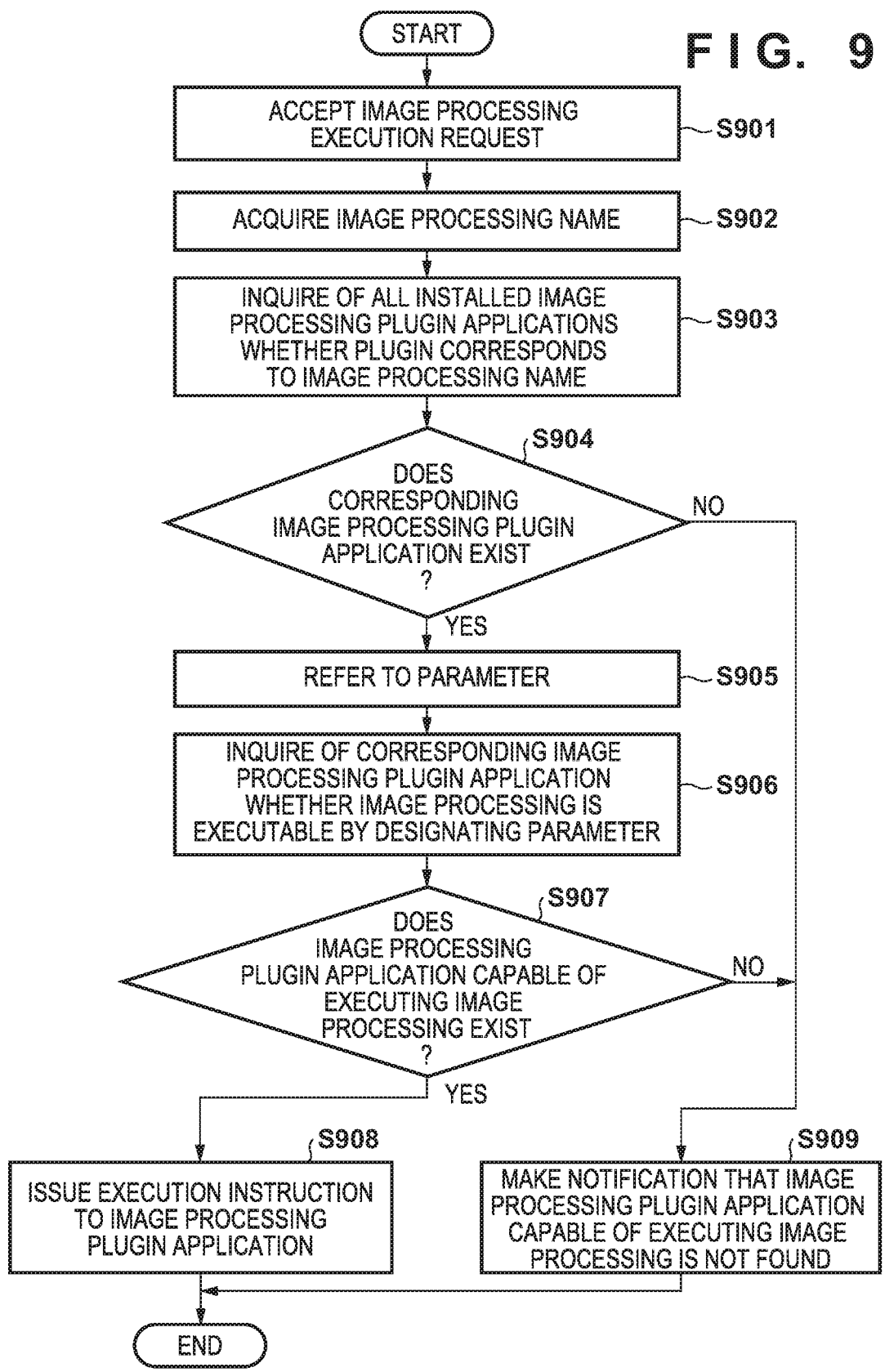
FIG. 9 is a flowchart showing a process of calling an image processing plugin application 303 according to an embodiment.

The details of processing for calling the image processing plugin application 303 by a connection library 332 in this embodiment will be described with reference to a flowchart shown in FIG. 9. Processing to be described below is implemented by, for example, loading programs stored in an HDD 213 in a RAM 212 and causing a CPU 211 to execute the programs. Note that the system arrangement and the processing procedure of this embodiment are the same as those described in the first embodiment above, a description thereof will be omitted, and only different portions will be described. More specifically, steps S901, S902, S908, and S909 are the same as steps S601, S602, S605, and S606.

In step S903, the connection library 332 designates an image processing name for all the installed image processing plugin applications 303 and makes an inquiry about whether a plugin corresponds to the image processing name. This is a process corresponding to the aforementioned filter of the first stage. In step S904, the connection library 332 determines whether the image processing plugin application 303 corresponding to the designated image processing name exists. If the image processing plugin application 303 exists, the process advances to step S905. If the image processing plugin application 303 does not exist, the process advances to step S909. For example, in a case in which an image processing name "OCR" is designated in step S901, the process advances to step S905 if the image processing plugin application 303 holding the same image processing name as "OCR" exists. In step S905, the connection library 332 refers to a parameter designated in step S901. In step S906, the connection library 332 designates a parameter for the image processing plugin application 303 detected in step S904 and makes an inquiry about whether image processing corresponding to it is executable. In the above-described example, a parameter "language: English" is designated for the image processing plugin application 303 having the image processing name "OCR", and an inquiry about whether image processing is executable is made. At this time, as in the above-described second embodiment, a determination of whether image processing is executable is made depending on whether an OCR dictionary supporting English exists in a predetermined directory or lower inside the image processing plugin application 303.

In addition, as the image processing plugin application 303 corresponding to the same image processing name, there is also a case in which both a plugin that performs processing inside an image forming apparatus 101 and a plugin that asks a server 105 to perform processing exist.

If image processing is performed inside the designated image forming apparatus 101, a communication time with the server 105 is not needed as compared with a case in which the server 105 is asked to perform processing, making it possible to execute processing in a short time. On the other hand, since a memory is shared with another function in the image forming apparatus 101, the memory may run short in some cases, influencing an operation of the other function. If the server 105 is asked to perform image processing, a memory of the image forming apparatus 101 is not used, preventing an influence given to the operation of the other function of the image forming apparatus 101.

That is, if the memory does not run short in the image forming apparatus 101, it is likely that a processing time can be shorter by executing processing by the image processing plugin application 303 which performs image processing inside the image forming apparatus 101 than by asking the server 105 to perform processing. On the other hand, if the memory may run short in the image forming apparatus 101, it is preferable that processing is executed by the image processing plugin application 303 which asks the server 105 to perform image processing.

Therefore, the image processing plugin application may determine, in accordance with memory utilization when performing image processing that satisfies a designated parameter, whether the image processing plugin application can execute designated image processing.

For example, the image processing plugin application 303 that performs image processing inside the image forming apparatus 101 determines whether image processing is executable based on a parameter for an input resolution such as "input image resolution: 600 DPI". In order to execute image processing corresponding to "input image resolution: 600 DPI", the utilization of the RAM 212 at the time of execution is large and may influence the execution of another function. Therefore, the image processing plugin application 303 which performs processing inside the image forming apparatus 101 determines that the image processing is unexecutable.

In addition, the image processing plugin application 303 which asks the server 105 to perform processing determines that it is possible to execute the image processing because a memory space can be secured sufficiently in the server 105.

On the other hand, if a parameter is "input image resolution: 300 DPI", the utilization of the RAM 212 at the time of execution is smaller than in the case of 600 DPI and is less likely to influence the execution of the other function. Accordingly, the image processing plugin application 303 which performs processing inside the image forming apparatus 101 determines that the image processing is executable.

In step S907, the connection library 332 determines, based on a designated parameter, whether the image processing plugin application 303 capable of executing processing exists. If the image processing plugin application 303 exists, the process advances to step S908. If the image processing plugin application 303 does not exist, the process advances to step S909.

According to a method shown in this embodiment, it becomes possible to maintain both the processing speed and flexibility by selecting the image processing plugin application 303 by operating the two-stage filters.

<Modification>

The present invention is not limited to the above-described embodiments, and various modifications can be made. For example, the image processing plugin application 303 that performs image processing inside the image forming apparatus 101 may dynamically determine, in accordance with not only a designated parameter but also a use situation of the RAM 212 in the image forming apparatus 101, whether image processing is executable.

For example, the image processing plugin application 303 which performs processing inside the image forming apparatus 101 determines that the image processing is executable if the free space of the RAM 212 is equal to or larger than a predetermined space even in a case in which "input image resolution: 600 DPI" is input as a parameter. On the other hand, the image processing plugin application 303 which performs processing inside the image forming apparatus 101 determines that the image processing cannot be executed upon receiving "input image resolution: 600 DPI" as the parameter if the free space of the RAM 212 is smaller than the predetermined space.

Figure 10:
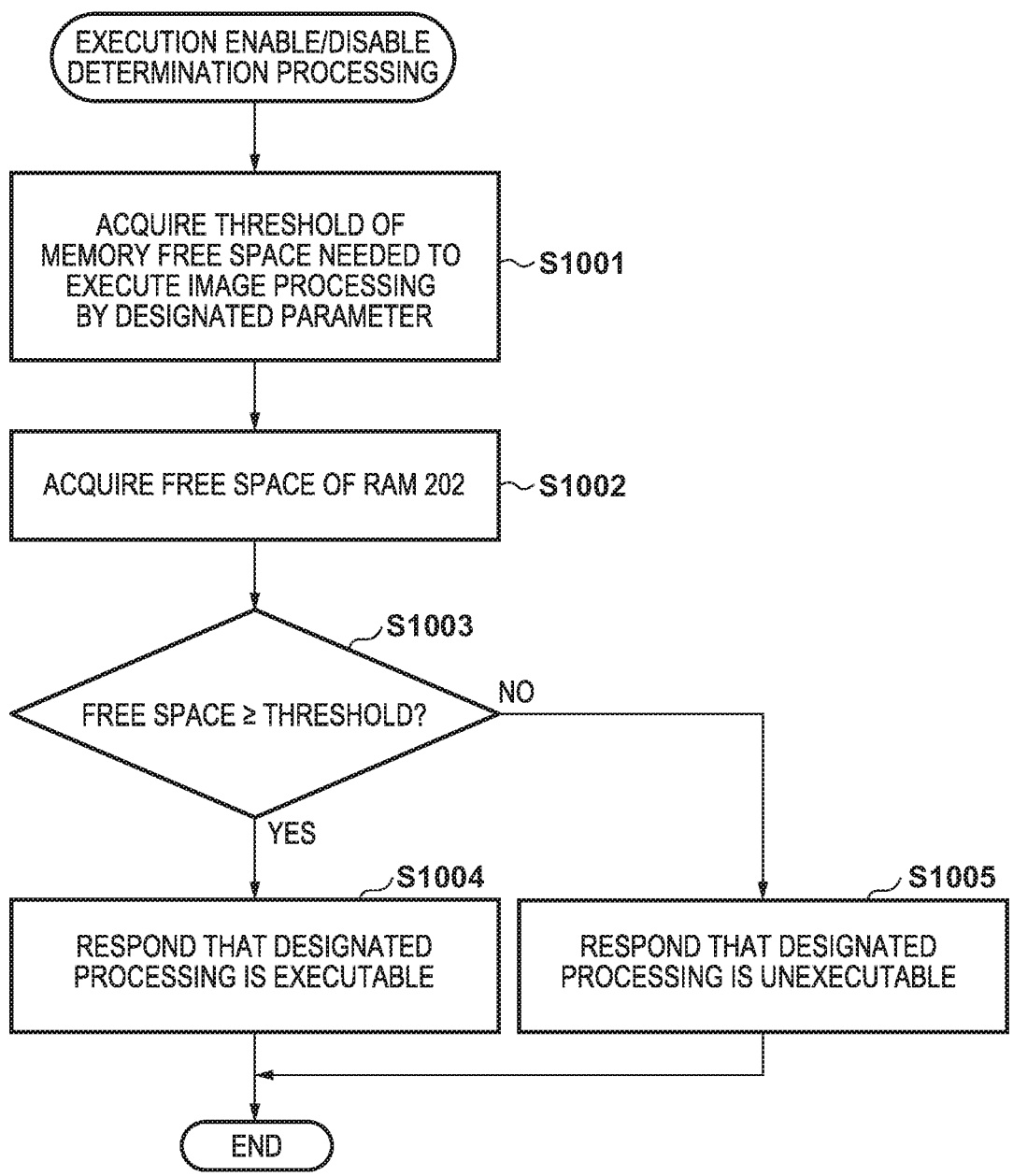
FIG. 10 is a flowchart showing execution enable/disable determination processing according to the embodiment.

The above-described processing will be described with reference to a flowchart in FIG. 10. Processing by this flowchart is implemented by causing the CPU 211 to execute the image processing plugin application 303. Processing to be described below is implemented by, for example, loading programs stored in the HDD 213 in the RAM 212 and causing the CPU 211 to execute the programs.

In step S1001, the image processing plugin application 303 acquires a threshold of a memory free space needed to execute image processing according to a designated parameter. For example, the image processing plugin application 303 manages information which associates an image processing parameter and a threshold concerning a memory space with each other, and acquires a threshold corresponding to the designated parameter with reference to the information. The association information is stored in, for example, a storage unit such as the HDD 213 of the image forming apparatus 101 when installing the image processing plugin application 303.

Next, in step S1002, the image processing plugin application 303 acquires the free space of the RAM 212. Step S1002 is space acquisition processing for acquiring the use situation of the memory of the image forming apparatus 101. Subsequently, in step S1003, the image processing plugin application 303 determines whether the free space acquired in step S1002 is equal to or larger than the threshold acquired in step S1001.

If the free space acquired in step S1002 is equal to or larger than the threshold acquired in step S1001, the process advances to step S1004 in which the image processing plugin application 303 responds to the connection library 332 that the designated image processing is executable, thereby ending the processing. On the other hand, if the free space acquired in step S1002 is smaller than the threshold acquired in step S1001, the process advances to step S1005 in which the image processing plugin application 303 responds to the connection library 332 that the execution of the designated image processing is impossible, thereby ending the processing.

As described above, the image processing plugin application 303 determines, based on a memory use situation and a threshold concerning the memory use situation, whether a specific plugin application can execute image processing according to a parameter. It is thus possible, in accordance with the memory use situation of the image forming apparatus 101, to dynamically respond with enabling/disabling of the execution of designated image processing. In addition, based on responded contents (determination result), the connection library 332 can select a plugin application capable of executing image processing according to a designated parameter.

In this modification, an example in which the image processing plugin application 303 determines whether designated image processing is executable has been described. However, the modification is not limited to this, and the connection library 332 may perform the determination. For example, the connection library 332 manages identification information of the image processing plugin application 303, an image processing parameter, and a threshold concerning a memory space in association with each other. Then, based on the parameter and the threshold associated with the identification information of the image processing plugin application 303 of a determination target, the same processing as processing shown in FIG. 10 may be executed. In this case, processing shown in FIG. 10 is implemented by loading program codes stored in the HDD 213 in the RAM 212 and causing the CPU 211 to execute the program codes.

In step S1004, the connection library 332 determines that the image processing plugin application 303 of the determination target can execute designated processing. Furthermore, in step S1005, the connection library 332 determines that the image processing plugin application 303 of the determination target cannot execute designated processing.

It is also possible to dynamically determine, in accordance with the memory use situation of the image forming apparatus 101, enabling/disabling of the execution of designated image processing in the above described manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-197059 filed on Oct. 10, 2017, and Japanese Patent Application No. 2018-006687 filed on Jan. 18, 2018, which are hereby incorporated by reference herein in their entirety.

What is claimed is:

1. An image processing apparatus capable of adding a function to be provided by installing a plugin application, the apparatus comprising:
   a memory device that stores a set of instructions; and
   at least one processor that executes the set of instructions to:
   accept a request to execute predetermined processing using the function;
   acquire, from the accepted request, identification information of the predetermined processing and a parameter to be used for executing the predetermined processing;
   perform a first inquiry of one or more plugin applications installed in the image processing apparatus as to whether or not the predetermined processing identified by the acquired identification information is executable;
   perform a second inquiry of at least one plugin application identified as a result of the first inquiry as to whether or not the predetermined processing is executable using the parameter; and
   instruct one plugin application identified as a result of the second inquiry to execute the process using the parameter.

2. The image processing apparatus according to claim 1, wherein the at least one processor executes instructions in the memory device to:
   notify each installed plugin application of a processing name, make an inquiry about whether the predetermined processing is executable, and select a plugin application which has responded that the plugin application can execute the predetermined processing.

3. The image processing apparatus according to claim 1, wherein the at least one processor executes instructions in the memory device to:
   register the plugin application and a processing name indicating a name of processing to be executed by the plugin application in linkage with each other when the plugin application is installed; and select a plugin application registered in linkage with the registered processing name in a case where the acquired processing name is registered.

4. The image processing apparatus according to claim 1, wherein the at least one processor executes instructions in the memory device to:

select a plugin application capable of executing the predetermined processing by using a parameter related to the predetermined processing in addition to a processing name.

5. The image processing apparatus according to claim 4, wherein in a case in which the predetermined processing is OCR processing, the processing name includes an OCR character string, and the parameter indicates an OCR language.

6. The image processing apparatus according to claim 4, wherein the parameter indicates a resolution of an input image on which the predetermined processing is performed.

7. The image processing apparatus according to claim 1, wherein the at least one processor executes instructions in the memory device to:

notify a request source that a plugin application capable of executing the predetermined processing does not exist in a case where the plugin application capable of executing the predetermined processing is not selected.

8. The image processing apparatus according to claim 1, wherein the at least one processor executes instructions in the memory device to:

select an processing client provided by an external apparatus as a plugin application capable of executing the predetermined processing.

9. The image processing apparatus according to claim 1, wherein the one plugin application includes identification information of processing which the one plugin application can execute, and the at least one processor executes instructions in the memory device to:

inquire of one or more plugin applications including the one plugin application whether or not the processing identified by the identification information is executable.

10. A method for controlling an image processing apparatus capable of adding a function to be provided by installing a plugin application, the method comprising:

accepting a request to execute predetermined processing using the function;

acquiring, from the accepted request, identification information of the predetermined processing and a parameter to be used for executing the predetermined processing;

performing a first inquiry of one or more plugin applications installed in the image processing apparatus as to whether or not the processing identified by the acquired identification information is executable;

performing a second inquiry of at least one plugin application identified as a result of the first inquiry as to whether or not the processing is executable using the parameter; and instructing one plugin application identified as a result of the second inquiry to execute the process using the parameter.

11. A non-transitory computer-readable storage medium storing a program for causing a computer to execute each step in a method for controlling an image processing apparatus capable of adding a function to be provided by installing a plugin application, the method comprising:

accepting a request to execute predetermined processing using the function;

acquiring, from the accepted request, identification information of the predetermined processing and a parameter to be used for executing the predetermined processing;

performing a first inquiry of one or more plugin applications installed in the image processing apparatus as to whether or not the processing identified by the acquired identification information is executable;

performing a second inquiry of at least one plugin application identified as a result of the first inquiry as to whether or not the processing is executable using the parameter; and instructing one plugin application identified as a result of the second inquiry to execute the process using the parameter.

\* \* \* \* \*